(12) United States Patent
Takata

(10) Patent No.: US 9,677,463 B2
(45) Date of Patent: Jun. 13, 2017

(54) AXIAL-FLOW TURBINE FOR TURBOCHARGER

(75) Inventor: Ryo Takata, Tokyo (JP)

(73) Assignee: MITSUBISHI HEAVY INDUSTRIES, LTD., Tokyo (JP)

(*) Notice: Subject to any disclaimer, the term of this patent is extended or adjusted under 35 U.S.C. 154(b) by 349 days.

(21) Appl. No.: 14/410,419

(22) PCT Filed: Aug. 31, 2012

(86) PCT No.: PCT/JP2012/072193
§ 371 (c)(1),
(2), (4) Date: Jan. 26, 2015

(87) PCT Pub. No.: WO2014/033920
PCT Pub. Date: Mar. 6, 2014

(65) Prior Publication Data
US 2015/0167543 A1    Jun. 18, 2015

(51) Int. Cl.
*F01D 11/04* (2006.01)
*F02B 39/00* (2006.01)
(Continued)

(52) U.S. Cl.
CPC .............. *F02B 39/00* (2013.01); *F01D 9/026* (2013.01); *F01D 11/04* (2013.01); *F01D 17/105* (2013.01);
(Continued)

(58) Field of Classification Search
CPC .......... F02B 39/00; F01D 9/026; F01D 11/04; F01D 17/105; F01D 25/24; F02C 6/12;
(Continued)

(56) References Cited

U.S. PATENT DOCUMENTS

| 4,808,091 A | * | 2/1989 | Ruetz | ..................... F01D 25/16 384/556 |
| 5,094,587 A | | 3/1992 | Woollenweber | |

(Continued)

FOREIGN PATENT DOCUMENTS

| CN | 1307171 A | 8/2001 |
| CN | 1821552 A | 8/2006 |

(Continued)

OTHER PUBLICATIONS

Chinese Office Action and Search Report dated Jun. 3, 2016, for Chinese Applcation No. 201280074893.3 with the English translation.

(Continued)

*Primary Examiner* — Dwayne J White
*Assistant Examiner* — Sang K Kim
(74) *Attorney, Agent, or Firm* — Birch, Stewart, Kolasch & Birch, LLP

(57) ABSTRACT

An object is to provide an axial-flow turbine for a turbocharger in which low-temperature outside air or lubricant oil does not flow backward into a gas flow path from a gap between an upstream end face of a hub part and a housing end face. An axial-flow turbine for a turbocharger includes a bearing, a rotational shaft supported rotatably by the bearing, a hub part disposed on an axial end of the rotational shaft, a turbine wheel having a plurality of rotor blades protruding outwardly in a radial direction from a circumferential face of the hub part; and a housing which houses the turbine wheel and which at least includes a rotational shaft housing section accommodating the rotational shaft, a scroll part which swirls gas having been introduced into the housing around the rotational shaft, and a bend section which is formed around the rotational shaft housing section and configured to direct gas having flowed out from an outlet (Continued)

of the scroll part in an axial direction. The housing includes a bypass flow path disposed at an upstream side with respect to a housing end face facing an upstream end face of the hub part of the turbine wheel and through which the bend section and the rotational shaft housing section are in communication with each other.

5 Claims, 8 Drawing Sheets

(51) Int. Cl.
  *F01D 17/10* (2006.01)
  *F01D 25/24* (2006.01)
  *F02C 6/12* (2006.01)
  *F01D 9/02* (2006.01)

(52) U.S. Cl.
  CPC ............... *F01D 25/24* (2013.01); *F02C 6/12* (2013.01); *F05D 2220/40* (2013.01); *F05D 2260/606* (2013.01)

(58) Field of Classification Search
  CPC ........... F05D 2220/40; F05D 2260/606; F04D 29/10; F04D 29/102
  See application file for complete search history.

(56) References Cited

U.S. PATENT DOCUMENTS

| | | | | |
|---|---|---|---|---|
| 5,567,129 | A * | 10/1996 | Bonardi | F01D 3/00 417/365 |
| 5,870,894 | A * | 2/1999 | Woollenweber | F02B 37/005 417/407 |
| 6,032,466 | A * | 3/2000 | Woollenweber | F01D 25/164 417/407 |
| 6,231,302 | B1 * | 5/2001 | Bonardi | F01D 25/22 415/105 |
| 7,530,230 | B2 * | 5/2009 | Shibui | F02B 37/04 290/52 |
| 8,419,350 | B2 * | 4/2013 | Just | F01D 5/04 415/111 |
| 8,784,036 | B2 * | 7/2014 | Woollenweber | F01D 5/082 415/112 |
| 2001/0017032 | A1 | 8/2001 | Jinnai | |
| 2006/0168959 | A1 | 8/2006 | Jinnai et al. | |
| 2006/0179838 | A1 | 8/2006 | Nakagawa et al. | |
| 2007/0089414 | A1 | 4/2007 | Yokoyama et al. | |

FOREIGN PATENT DOCUMENTS

| | | |
|---|---|---|
| CN | 1834407 A | 9/2006 |
| CN | 1952361 A | 4/2007 |
| JP | 62-165531 A | 7/1987 |
| JP | 5-19013 B2 | 3/1993 |
| JP | 9-144550 A | 6/1997 |
| JP | 10-103071 A | 4/1998 |
| JP | 11-343808 A | 12/1999 |
| JP | 2004-510094 A | 4/2004 |
| JP | 2005-240727 A | 9/2005 |
| JP | 2010-127106 A | 6/2010 |
| JP | 2013-133819 A | 7/2013 |

OTHER PUBLICATIONS

Decision to Grant a Patent drafted Apr. 17, 2013 in related Japanese Application No. JP2013-509372.
International Preliminary Report on Patentability mailed Mar. 12, 2015 in related Application No. PCT/JP2012/072193 with an English translation.
International Search Report dated Nov. 6, 2012 received in related International Application No. PCT/JP2012/072193.
International Search Report dated Nov. 6, 2012.
Notice of Allowance effective Aug. 19, 2016 to the corresponding Chinese Application No. 201280074893.3 with English Translation.
Extended European Search Report issued Jul. 3, 2015 in corresponding EP Application No. 12883498.3.

* cited by examiner

Related Art

AXIAL-FLOW TURBINE FOR TURBOCHARGER

TECHNICAL FIELD

The present disclosure relates to an axial-flow turbine for a turbocharger.

BACKGROUND

In a compact turbocharger such as an automobile turbocharger, an axial-flow turbine which rotates a turbine wheel with fluid flowing in the axial direction has been recently developed to replace the conventional radial turbines for the purpose of restricting turbo lags with reduced inertia, for example.

FIG. 10 is a schematic cross-sectional view of a configuration of an axial-flow turbine for a turbocharger.

As illustrated in FIG. 10, an axial-flow turbine 100 for a turbocharger includes a housing 120, and a rotational shaft 104 and a turbine wheel 110 accommodated in the housing 120.

The rotational shaft 104 is rotatably supported on the bearing 102 about the center axis CL. A hub part 106 of a cylindrical shape is disposed on an axial end of the rotational shaft 104. Further, a shaft sealing part 102a for sealing the circumferential face of the rotational shaft 104 is disposed between the bearing 102 and the hub part 106. A plurality of rotor blades 108 protrude outwardly in the radial direction from the flat circumferential face 106a of the hub part 106. The hub part 106 and the plurality of rotor blades 108 constitute the above described turbine wheel 110.

The housing 120 accommodates the above turbine wheel 110. A rotational shaft housing section 126 is formed inside the housing 120, for accommodating the rotational shaft 104 in the vicinity of the center axis CL and about the center axis CL. A scroll part 122 and a bend section 124 are formed around the rotational shaft housing section 126. The scroll part 122 swirls the exhaust gas introduced into the housing 120 around the rotational shaft 104. The bend section 124 directs the flow of the exhaust gas having flowed out from an outlet 122a of the scroll part 122 in the axial direction. Further, a downstream flow path section 128 is formed on the downstream side of the turbine wheel 110. The exhaust gas, having flowed from the scroll part 122 through the bend section 124 to rotate the turbine wheel 110, flows into the downstream flow path section 128 and then exits into an exhaust gas channel (not illustrated) from the downstream flow path section 128.

CITATION LIST

Patent Literature

Patent Document 1: Japanese Unexamined Patent Application No. 11-343808
Patent Document 2: Japanese Unexamined Patent Application No. 2005-240727

SUMMARY

Technical Problem

The inventors found that pressure P1h in the vicinity of the inner circumferential face on the upstream side of the turbine wheel 110 may decrease in a relatively small axial-flow turbine having a low boss ratio (root diameter/tip diameter of a rotor blade) such as a turbocharger for an automobile. There is a gap 130 at the upstream side of the turbine wheel 110, between the upstream end face 106b of the hub part 106 and the housing end face 120a of the housing 120, the gap 130 communicating to the rotational shaft housing section 126. Thus, when pressure P1h in the vicinity of an opening of the gap 130 becomes lower than the atmosphere pressure Pa, low-temperature outside air or lubricant oil may leak from the shaft sealing part 102a to flow backward into the bend section 124 through the gap 130 as indicated by the arrow f' in the drawing, which may lead to a decrease in turbine efficiency due to turbulence of exhaust-gas flow caused by the backward outside air, or to erosion of the rotor blades 108 caused by penetration of the lubricant oil, for instance.

Patent Documents 1 and 2 disclose techniques related to a leaking flow of fluid passing through the rotor blade section in an axial-flow turbine similar to that of the present invention. However, Patent Documents 1 and 2 are different from the present invention in that the above described backward flow of the outside air or lubricant oil is not viewed as a problem.

At least one embodiment of the present invention was made in view of the above described problems to provide an axial-flow turbine for a turbocharger in which low-temperature outside air or lubricant oil does not flow backward into a gas flow path from a gap between an upstream end face of a hub part and a housing end face.

The object of at least one embodiment of the present invention also includes providing an axial-flow turbine for a turbocharger which is capable of preventing a decrease in turbine efficiency by reducing the thickness of a boundary layer formed in the vicinity of the circumferential face of the hub part.

Solution to Problem

To achieve the above object, at least one embodiment of the present invention provides an axial-flow turbine for a turbocharger including: a bearing; a rotational shaft supported rotatably by the bearing; a turbine wheel including a hub part disposed on an axial end of the rotational shaft and a plurality of rotor blades protruding outwardly in a radial direction from a circumferential face of the hub part; and a housing which houses the turbine wheel and which at least includes a rotational shaft housing section accommodating the rotational shaft, a scroll part which swirls gas having been introduced into the housing around the rotational shaft, and a bend section which is formed around the rotational shaft housing section and configured to direct gas having flowed out from an outlet of the scroll part in an axial direction. The housing also includes a bypass flow path disposed at an upstream side with respect to a housing end face facing an upstream end face of the hub part of the turbine wheel. The bend section and the rotational shaft housing section are in communication with each other through the bypass flow path.

The axial-flow turbine for a turbocharger with the above configuration includes the bypass flow path disposed at the upstream side with respect to the gap between the upstream end face of the hub part and the housing end face. The bend section and the rotational shaft housing section are in communication with each other through this bypass flow path. Thus, exhaust gas flows into the rotational shaft housing section from the bend section through the bypass flow path, which makes it possible to prevent outside air or lubricant oil from flowing backward into a gas flow path such as the bend section through the gap between the upstream end face of the hub part and the housing end face.

Further, in the axial-flow turbine for a turbocharger according to one embodiment of the present invention, the rotational shaft housing section is in communication with the bend section through the bypass flow path at a position where a pressure in the bend section is higher than an atmosphere pressure.

As described above, the rotational shaft housing section is in communication with the bend section through the bypass flow path at a position where the pressure in the bend section is higher than the atmosphere pressure. As a result, gas having a higher pressure than the atmosphere pressure flows into the rotational shaft housing section through the bypass flow path, which makes it possible to securely prevent outside air or lubricant oil from flowing backward into a gas flow path such as the bend section.

Further, in the axial-flow turbine for a turbocharger according to one embodiment of the present invention, the rotational shaft housing section is partitioned into a bearing side and a turbine wheel side by a sealing part disposed between the bearing and the turbine wheel. The bend section and the turbine wheel side of the rotational shaft housing section are in communication with each other through the bypass flow path.

The bend section is in communication with the turbine wheel side of the rotational shaft housing section through the above bypass flow path in the case where the rotational shaft housing section is partitioned into the bearing side and the turbine wheel side as described above. This makes it possible to prevent low-temperature outside air or lubricant oil from leaking from the bearing side.

Further, in the axial-flow turbine for a turbocharger according to one embodiment of the present invention, the housing includes a protruding portion disposed on an outer circumferential edge of the housing end face facing the upstream end face of the hub part of the turbine wheel, the protruding portion protruding from the housing end face.

With the housing including the above described protruding portion, it is possible to direct the flowing direction of the returning gas in the axial direction when the gas having flowed into the rotational shaft housing section from the bypass flow path returns to a gas flow path such as the bend section through the gap between the upstream end face of the hub part and the housing end face. Thus, it is possible to prevent a decrease in turbine efficiency due to the returning gas flow.

Further, in the axial-flow turbine for a turbocharger according to one embodiment of the present invention, a diameter of the upstream end face of the hub part of the turbine wheel is smaller than a diameter of the outer circumferential edge of the housing end face facing the upstream end face of the hub part.

The diameter of the upstream end face of the hub part of the turbine wheel is smaller than the diameter of the outer circumferential edge of the housing end face as described above. In this way, when the gas having flowed into the rotational shaft housing section from the bypass flow path returns to a gas flow path such as the bend section through the gap between the upstream end face of the hub part and the housing end face, it is possible to restrict the returning gas from being mixed with a gas flow in the gas flow path. Thus, it is possible to prevent a decrease in turbine efficiency due to the returning gas flow.

Furthermore, to achieve the above object, at least one embodiment of the present invention provides an axial-flow turbine for a turbocharger including: a bearing; a rotational shaft supported rotatably by the bearing; a turbine wheel including a hub part disposed on an axial end of the rotational shaft and a plurality of rotor blades protruding outwardly in a radial direction from a circumferential face of the hub part; and a housing which accommodates the turbine wheel and which at least includes a rotational shaft housing section and the rotational shaft; a scroll part which swirls gas having been introduced into the housing around the rotational shaft; and a bend section which is formed around the rotational shaft housing section and configured to direct gas having flowed out from an outlet of the scroll part in an axial direction. A protrusion protruding from an upstream end face of the hub part is also formed on an outer circumferential edge of the upstream end face.

The axial-flow turbine for a turbocharger with the above configuration includes a protrusion formed on the outer circumferential edge of the upstream end face. The protrusion protrudes from the upstream end face of the hub part. Thus, it becomes easier for the exhaust gas flowing through a gas flow path such as the bend section to enter the gap between the upstream end face of the hub part and the housing end face. As a result, it is possible to reduce the thickness of the boundary layer formed in the vicinity of the circumferential face of the hub part, which makes it possible to prevent a decrease in turbine efficiency.

Further, in the axial-flow turbine for a turbocharger according to one embodiment of the present invention, a diameter of the upstream end face of the hub part of the turbine wheel is larger than a diameter of a downstream end face of the hub part.

In a case where the diameter of the upstream end face of the hub part of the turbine wheel is larger than the diameter of the downstream end face of the hub part as described above, the boundary layer formed in the vicinity of the circumferential face of the hub part has a thickness which increases toward the downstream side. Thus, providing the protrusion protruding from the upstream end face of the hub part on the outer circumferential edge of the upstream end face makes it possible to reduce the thickness of the boundary layer formed in the vicinity of the circumferential face of the hub part, which is effective in preventing a decrease of turbine efficiency.

Advantageous Effects

According to at least one embodiment of the present invention, it is possible to provide an axial-flow turbine for a turbocharger in which low-temperature outside air or lubricant oil does not flow backward into a gas flow path through a gap between an upstream end face of a hub part and a housing end face.

According to at least one embodiment of the present invention, it is also possible to provide an axial-flow turbine for a turbocharger which is capable of preventing a decrease in turbine efficiency by reducing the thickness of a boundary layer formed in the vicinity of the circumferential face of a hub part.

DETAILED DESCRIPTION

Embodiments of the present invention will now be described in detail with reference to the accompanying drawings. It is intended, however, that unless particularly specified, dimensions, materials, shapes, relative positions and the like of components described in the embodiments shall be interpreted as illustrative only and not limitative of the scope of the present invention.

Figure 1:
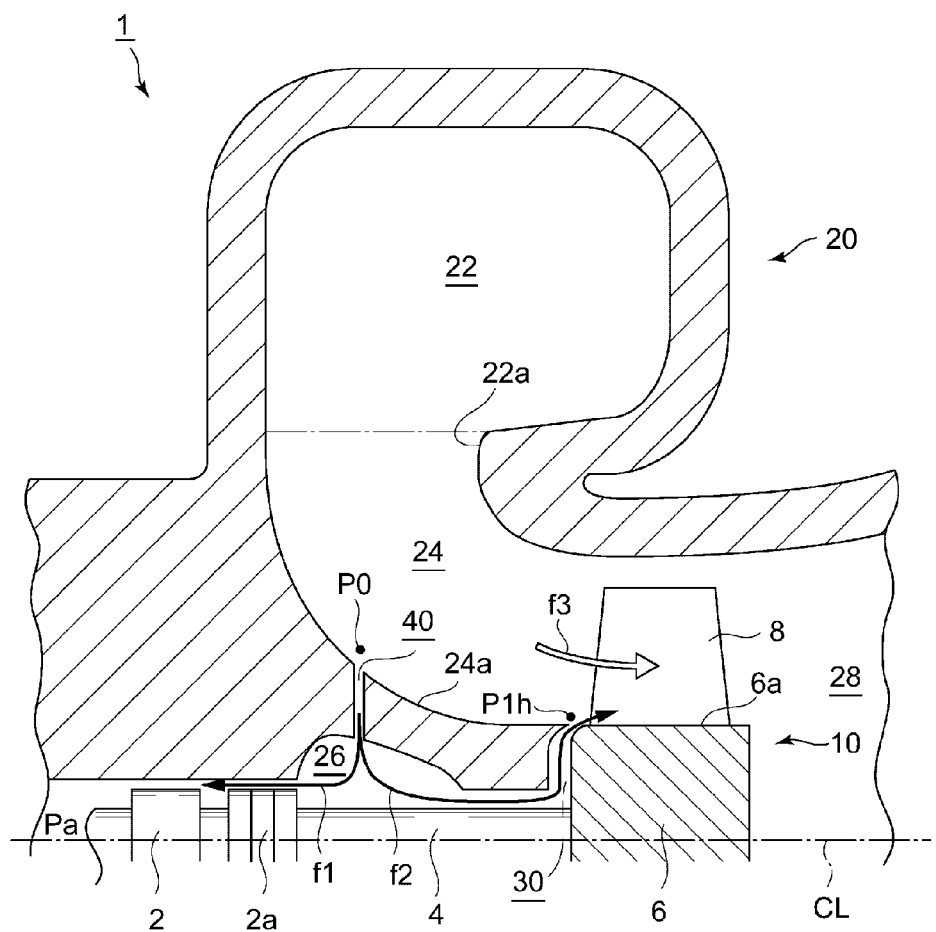
FIG. 1 is a schematic cross-sectional view of a configuration of an axial-flow turbine for a turbocharger according to one embodiment of the present invention.
Figure 2:
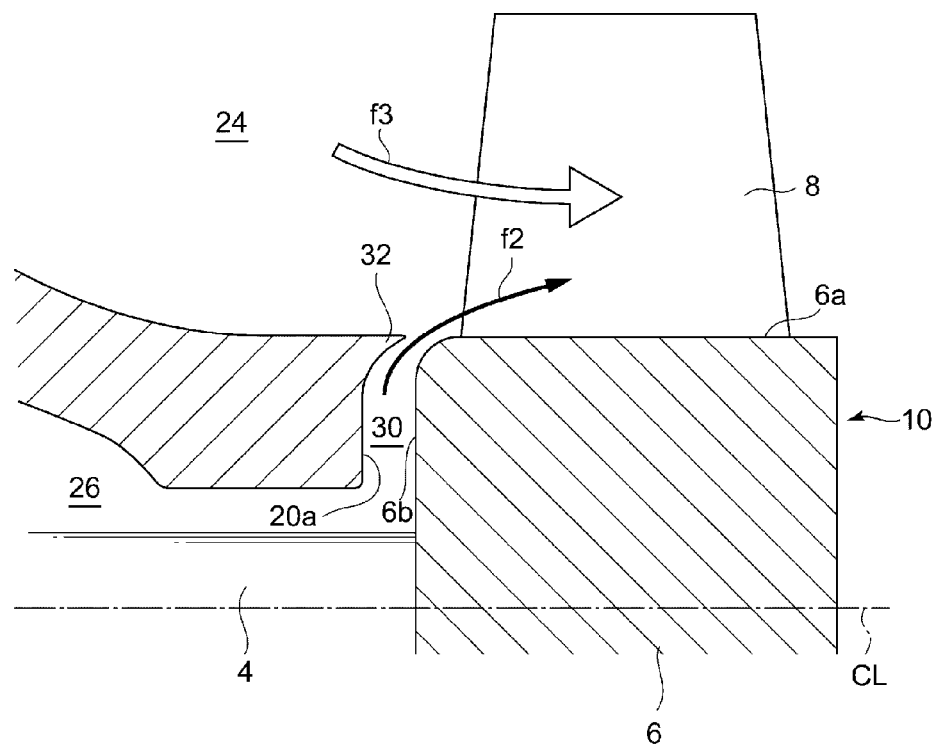
FIG. 2 is a schematic enlarged cross-sectional view of a part of the axial-flow turbine for a turbocharger from FIG. 1.

FIG. 1 is a schematic cross-sectional view of a configuration of an axial-flow turbine for a turbocharger according to one embodiment of the present invention. FIG. 2 is a schematic enlarged cross-sectional view of a part of the axial-flow turbine for a turbocharger from FIG. 1.

As illustrated in FIG. 1, an axial-flow turbine 1 for a turbocharger according to one embodiment of the present invention includes a housing 20, and a rotational shaft 4 and a turbine wheel 10 accommodated in the housing 20.

The rotational shaft 4 is rotatably supported about the center axis CL by a bearing 2. A hub part 6 of a cylindrical shape is disposed on an axial end of the rotational shaft 4. Further, a shaft sealing part 2a for sealing the circumferential face of the rotational shaft 4 is disposed on the rotational shaft 4 between the bearing 2 and the hub part 6. A plurality of rotor blades 8 protrude outwardly in the radial direction from the flat circumferential face 6a of the hub part 6. The hub part 6 and the plurality of rotor blades 8 constitute the above described turbine wheel 10.

The housing 20 accommodates the above turbine wheel 10. A rotational shaft housing section 26 which accommodates the rotational shaft 4 in the vicinity of the center axis CL and about the center axis CL is also formed inside the housing 20. Further, a scroll part 22 and a bend section 24 are formed around the rotational shaft housing section 26. The scroll part 22 swirls exhaust gas which has been introduced into the housing 20 around the rotational shaft 4. The bend section 24 directs the exhaust gas having been flowed out from the outlet 22a of the scroll part 22 in the axial direction. A downstream flow path section 28 is formed at the downstream side of the turbine wheel 10, so that the exhaust gas having flowed from the scroll part 22 through the bend section 24 to rotate the turbine wheel 10 flows into this downstream flow path section 28, and exits into an exhaust gas channel (not illustrated) from the downstream flow path section 28.

Still further, as illustrated in the enlarged view of FIG. 2, there is a gap 30, at the upstream side of the turbine wheel 10, disposed between an upstream end face 6b of the hub part 6 and a housing end face 20a of the housing 20 facing the upstream end face 6b. The gap 30 communicates with the rotational shaft housing section 26. Further, a protruding portion 32 protruding from the housing end face 20a is disposed on the outer circumferential edge of the housing end face 20a.

As illustrated in FIG. 1, the housing 20 includes a bypass flow path 40 disposed on the upstream side with respect to the housing end face 20a. The bend section 24 and the rotational shaft housing section 26 are in communication with each other through this bypass flow path 40. The bypass flow path 40 brings the rotational shaft housing section 26 into communication with a position where the pressure P0 of the inner circumferential face 24a of the bend section 24 is higher than the atmosphere pressure Pa while the axial-flow turbine 1 for a turbocharger is in operation.

In the axial-flow turbine 1 for a turbocharger with the above configuration according to one embodiment of the present invention, the exhaust gas flows into the rotational shaft housing section 26 from the bend section 24 as indicated by the arrow f1 in the drawing via the bypass flow path 40 disposed at the upstream side position with respect to the gap 30. Thus, it is possible to prevent low-temperature outside air or lubricant oil at the bearing 2 side with respect to the shaft sealing part 2a from flowing backward into a gas flow path such as the bend section 24 through the gap 30. As a result, it is possible to prevent a decrease in turbine efficiency due to turbulence of the gas flow f3 caused by the backward flow of the outside air, or to erosion of the rotor blades caused by penetration of the lubricating oil, for instance.

Further, gas having a pressure higher than the atmosphere pressure Pa flows into the rotational shaft housing section 26 via the bypass flow path 40 since the rotational shaft housing section 26 is in communication with a position where the pressure P0 in the bend section 24 is higher than the atmosphere pressure Pa via the bypass flow path 40 as described above. Thus, it is possible to securely prevent the low-temperature outside air or lubricant oil at the bearing 2 side with respect to the shaft sealing part 2a from flowing backward into a gas flow path such as the bend section 24.

Further, the protruding portion 32 protruding from the housing end face 20a is disposed on the outer circumferential edge of the housing end face 20a as described above. In this way, when the exhaust gas having flowed into the rotational shaft housing section 26 from the bypass flow path 40 returns to a gas flow path such as the bend section 24 through the gap 30, the exhaust gas having returned to the gas flow path is directed in the axial direction as indicated by the arrow f2 in the drawing. As a result, it is possible to restrict turbulence of the gas flow f3 in the gas flow path and thus to prevent a decrease in turbine efficiency due to the returning gas flow f2.

Figure 3A:
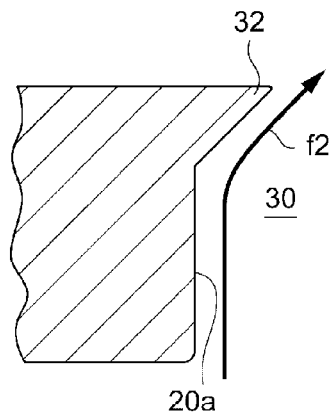
FIGS. 3A and 3B are cross-sectional views of an embodiment of a protruding portion.
Figure 3B:
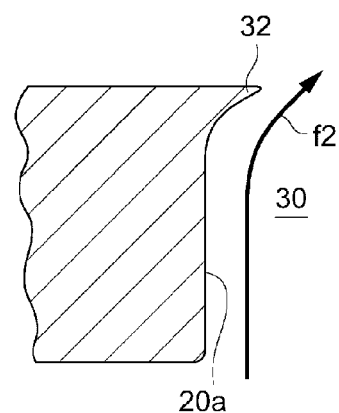

Although the cross-sectional shape of the protruding portion 32 is not particularly limited, it is desirable to form the undersurface side of the cross-section into a shape tapering or curving toward the downstream side in the axial direction so that the gas flow f2 of the exhaust gas flowing through the gap 30 is directed in the axial direction toward the downstream side, as illustrated in FIG. 3.

Figure 4:
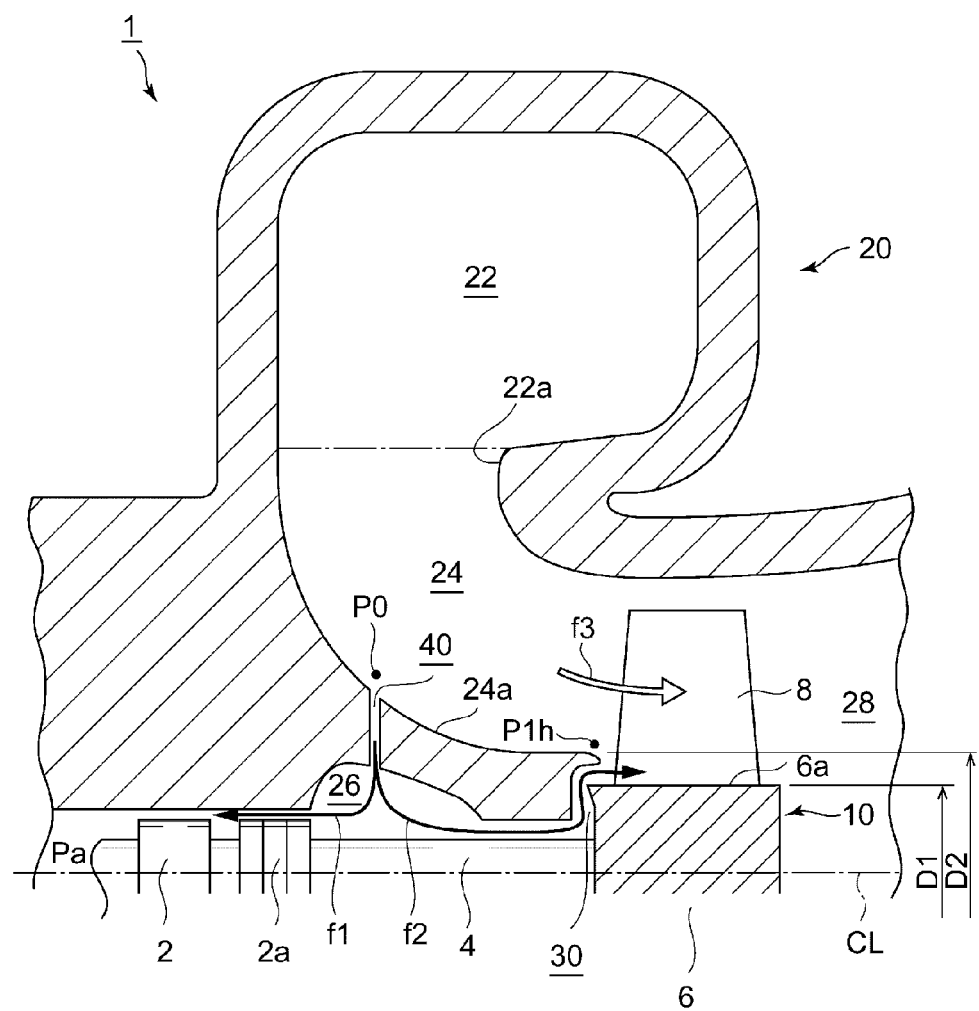
FIG. 4 is a schematic cross-sectional view of a configuration of an axial-flow turbine for a turbocharger according to one embodiment of the present invention.
Figure 5:
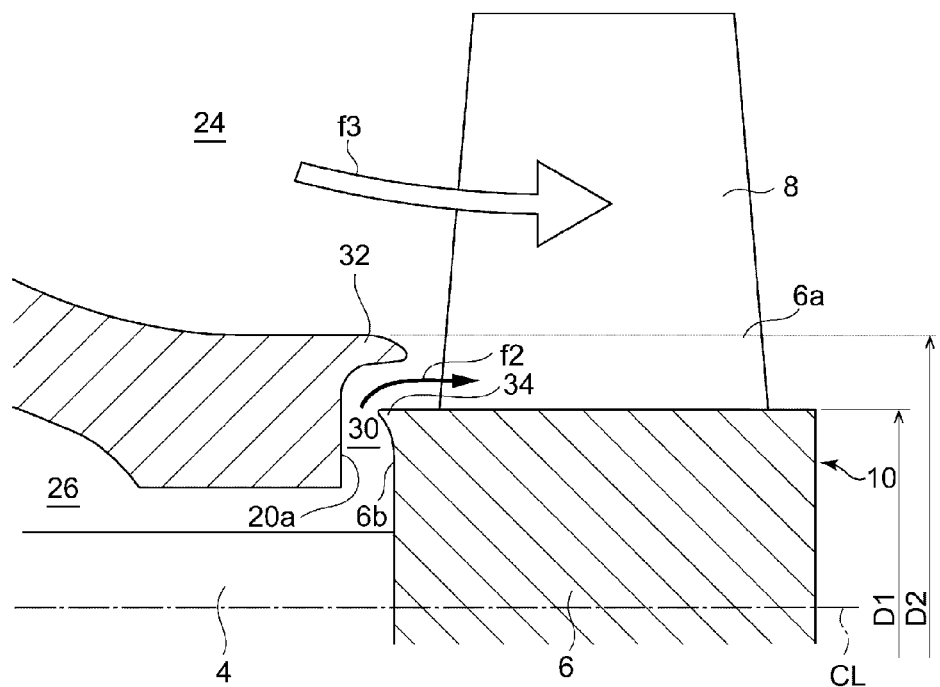
FIG. 5 is a schematic enlarged cross-sectional view of a part of the axial-flow turbine for a turbocharger from FIG. 4.

FIG. 4 is a schematic cross-sectional view of a configuration of an axial-flow turbine for a turbocharger according to one embodiment of the present invention. The axial-flow turbine 1 for a turbocharger illustrated in FIG. 4 is different from the one illustrated in FIG. 1 in that the diameter D1 of the upstream end face 6b of the hub part 6 of the turbine wheel 10 is smaller than the diameter D2 of the outer circumferential edge of the housing end face 20a facing the upstream end face 6b of the hub part 6. As illustrated in the enlarged view of FIG. 5, another difference is that the second protruding portion 34 protruding from the upstream end face 6b of the hub part 6 is provided on the outer circumferential edge of the upstream end face 6b.

Figure 6:
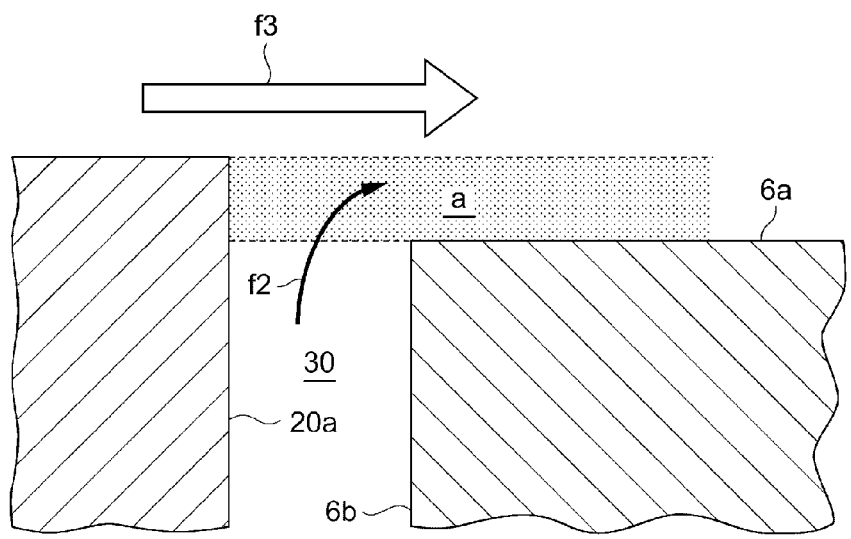
FIG. 6 is a cross-sectional view for describing the gas flow at a gap exit.

With the diameter D1 of the upstream end face 6b of the hub part 6 of the turbine wheel 10 being smaller than the diameter D2 of the outer circumferential edge of the housing end face 20a, the difference in radius between the two end faces produces a region "a" which serves as a buffering region for restricting turbulence in the gas flow f3 caused by the returning gas flow f2 when the exhaust gas having flowed into the rotational shaft housing section 26 from the bypass flow path 40 returns to a gas flow path such as the bend section 24 through the gap 30, as illustrated in the enlarged view of FIG. 6. This prevents a decrease in turbine efficiency due to the returning gas flow f2.

Further, with the second protruding portion 34 protruding from the upstream end face 6b of the hub part 6 being disposed on the outer circumferential edge of the upstream end face 6b, it is possible to direct the gas flow f2 returning to the bend section 24 through the gap 30 in the axial direction more accurately in cooperation with the protruding portion 32 protruding from the above described housing end face 20a.

While the rotational shaft housing section 26 in the above described embodiment is partitioned into the bearing side and the turbine wheel side by the shaft sealing part 2a disposed between the bearing 2 and the turbine wheel 10, the shaft sealing part 2a is not necessarily required in the present invention. Nevertheless, if the rotational shaft housing section 26 is partitioned into the bearing side and the turbine wheel side by the shaft sealing part 2a, it is possible to securely prevent the low-temperature outside air or lubricant oil from leaking from the bearing side by bringing the bend section 24 into communication with the turbine wheel side of the rotational shaft housing section 26 via the above described bypass flow path 40.

Figure 7:
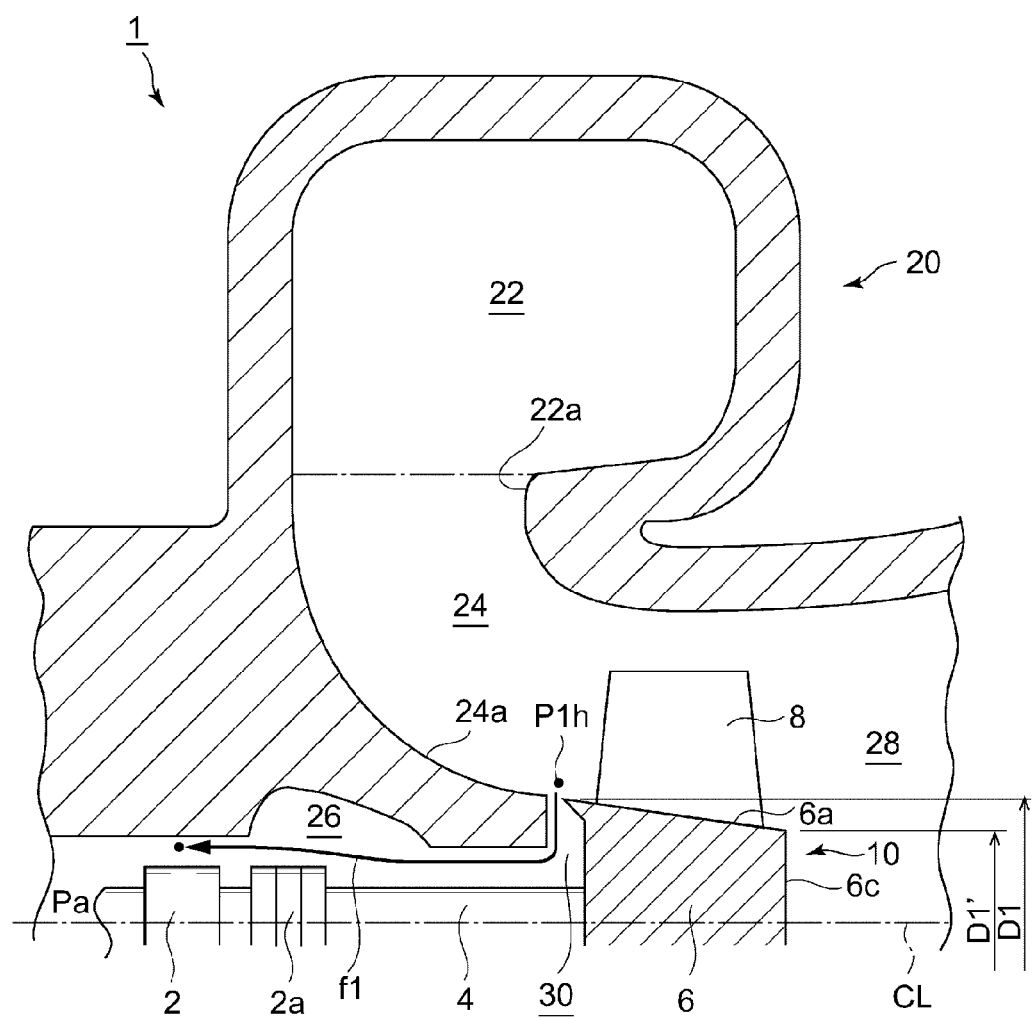
FIG. 7 is a schematic cross-sectional view of a configuration of an axial-flow turbine for a turbocharger according to one embodiment of the present invention.

FIG. 7 is a schematic cross-sectional view of another configuration of an axial-flow turbine for a turbocharger according to one embodiment of the present invention. The axial-flow turbine 1 for a turbocharger illustrated in FIG. 7 is different from the one illustrated in FIG. 1 in that there is no bypass flow path 40 provided to bring the bend section 24 into communication with the rotational shaft housing section 26. Further, as illustrated in the enlarged view of FIG. 8, another difference is that a protrusion 36 protrudes from the upstream end face 6b of the hub part 6, while the diameter D1 of the upstream end face 6b of the hub part 6 of the turbine wheel 10 is larger than the diameter D1' of the downstream end face 6c of the hub part 6 so that the circumferential face 6a of the hub part 6 is not flat but tapered.

Figure 8:
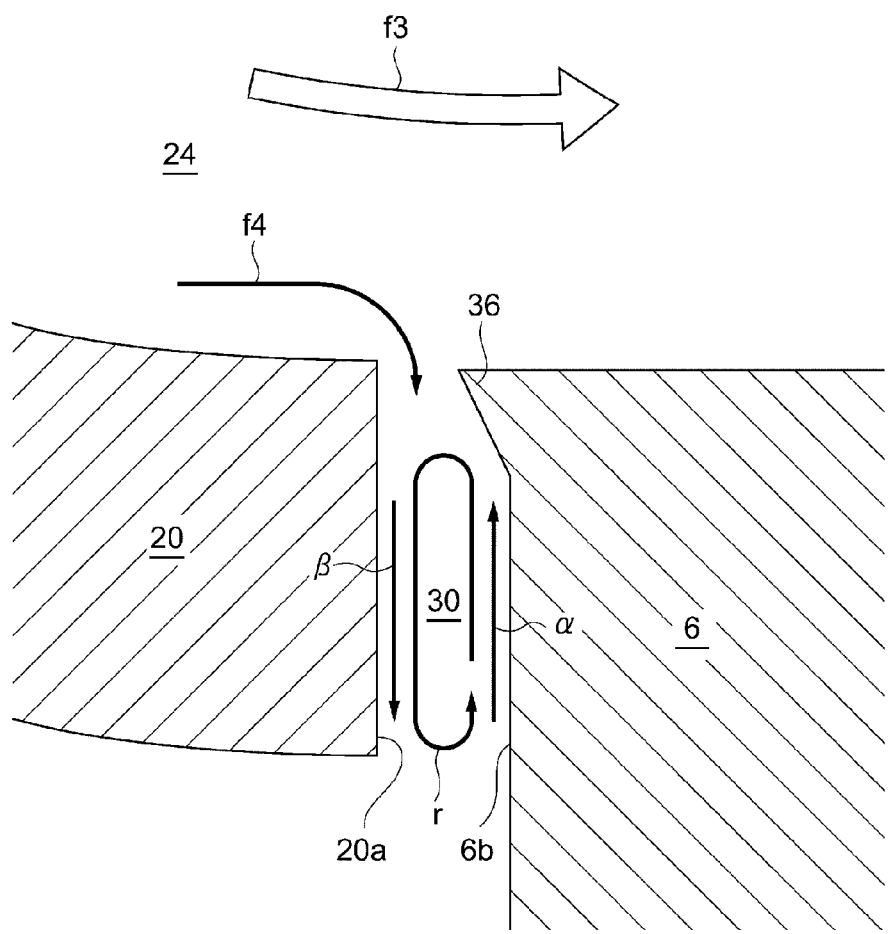
FIG. 8 is a cross-sectional view for describing the gas flow at a gap exit.

As illustrated in FIG. 8, a gas flow α flowing outwardly in the radial direction is generated by a centrifugal force in the vicinity of the upstream end face 6b which is the rotational face rotating with the rotational shaft 4. On the other hand, in the vicinity of the housing end face 20a which is a stationary face, a gas flow β flowing inwardly in the radial direction is generated. These gas flows α, β then generate a rotational flow γ which rotates in the counter-clockwise direction, for instance, in the gap 30 as illustrated in FIG. 8.

Figure 9A:
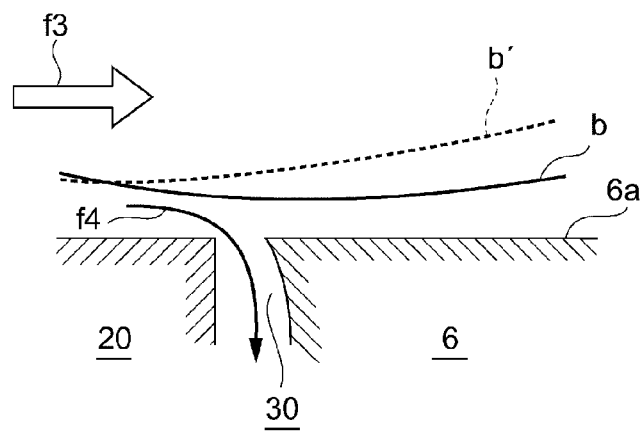
FIGS. 9A and 9B are cross-sectional views for describing a boundary layer in the vicinity of the circumferential face of the hub part.

As described above, with the protrusion 36 protruding from the upstream end face 6b of the hub part 6 formed on the outer circumferential edge of the upstream end face 6b, it becomes difficult for the gas flow α flowing outwardly in the radial direction to flow out into a gas flow path such as the bend section 24, which in turn makes it easy for the gas flow f4 to flow into the gap 30 from the gas flow path. Thus, as illustrated in FIG. 9A, a boundary layer formed in the vicinity of the circumferential face 6a of the hub part 6 is drawn in by the gas flow f4 flowing into the gap 30 so that the thickness of the boundary layer is reduced from b' to b, which makes it possible to prevent a decrease in turbine efficiency due to development of the boundary layer.

Figure 9B:
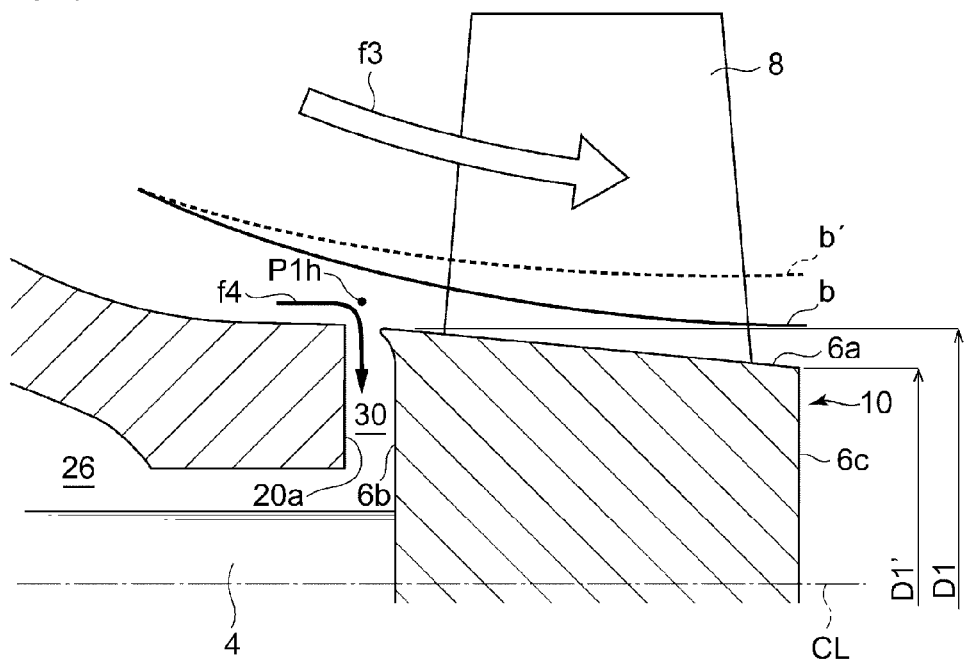
Figure 10:
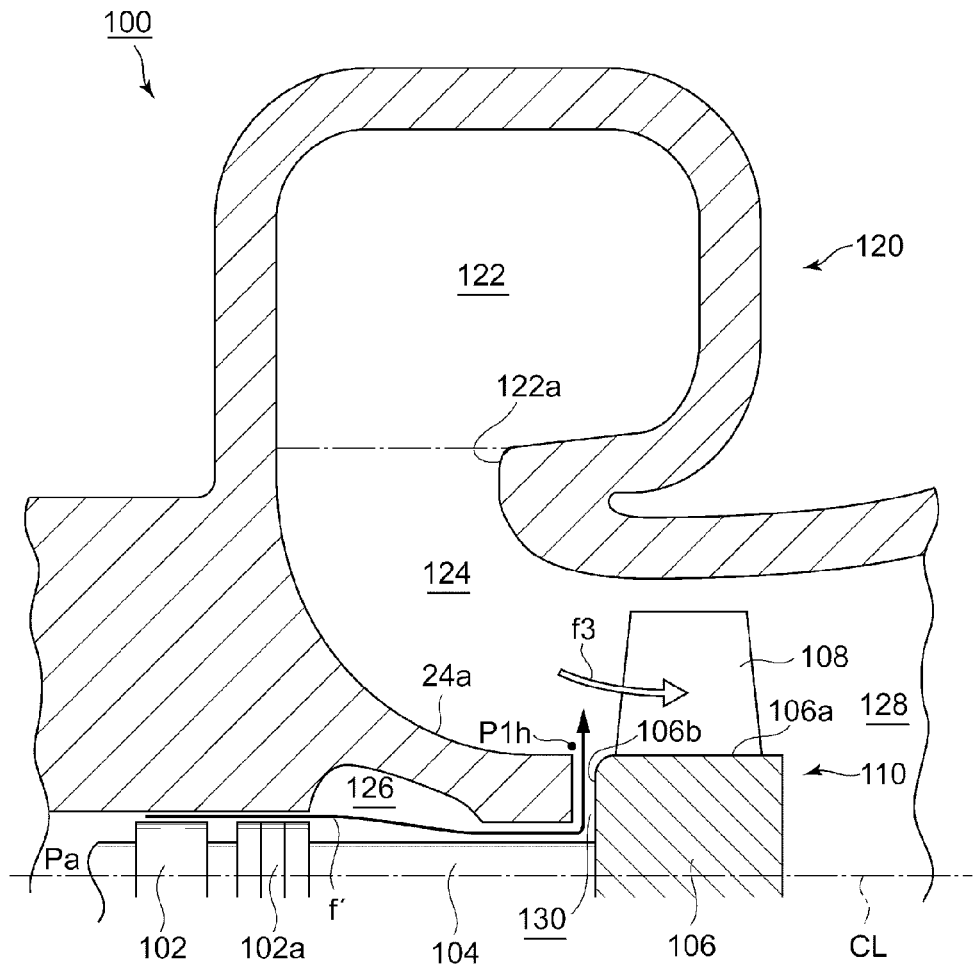
FIG. 10 is a schematic cross-sectional view of a configuration of an axial-flow turbine for a turbocharger of a reference example.

At this time, the diameter D1 of the upstream end face 6b of the hub part 6 of the turbine wheel 10 is larger than the diameter D1' of the downstream end face 6c of the hub part 6 while the circumferential face 6a of the hub part 6 is formed into a tapered face as described above. In this way, the boundary layer b' formed in the vicinity of the circumferential face 6a of the hub part 6 has a thickness which increases toward the downstream side as indicated by the dotted line in FIG. 9B, which decreases turbine efficiency. It is common to form the circumferential face 6a of the hub part 6 into a flat face in an axial-flow turbine in order to avoid such a decrease in turbine efficiency.

However, the inventors found that it is possible to increase the pressure P1h in the vicinity of the opening of the gap 30 by increasing the diameter D1 of the upstream end face 6b of the hub part 6. Thus, forming the upstream end face 6b of the hub part 6 to have an appropriate diameter D1 such that the pressure P1h is higher than the atmosphere pressure Pa while the axial-flow turbine 1 for a turbocharger is in operation makes it possible to prevent a backward flow from the rotational shaft housing section 26. Further, forming the above described protrusion 36 makes it possible to reduce the thickness of the boundary layer formed in the vicinity of the circumferential face 6b of the hub part 6. As a result, it is also possible to prevent a decrease in turbine efficiency.

Embodiments of the present invention were described in detail above, but the present invention is not limited thereto, and various amendments and modifications may be implemented within a scope that does not depart from the present invention.

INDUSTRIAL APPLICABILITY

At least one embodiment of the present invention can be suitably applied to an axial-flow turbine for a turbocharger, for instance, to an axial-flow turbine for a compact turbocharger such as an automobile turbocharge.

REFERENCE SIGNS LIST

1 Axial-flow turbine for a turbocharger
2 Bearing
2a Shaft sealing part
4 Rotational shaft
6 Hub part
6a Circumferential face
6b Upstream end face
8 Rotor blade
10 Turbine wheel
20 Housing
20a Housing end face
22 Scroll part
22a Outlet
24 Bend section
26 Rotational shaft housing section
28 Downstream flow path section
30 Gap 32 Protruding portion
34 Second protruding portion
36 Protrusion
40 Bypass flow path

The invention claimed is:

1. An axial-flow turbine for a turbocharger, comprising:
a bearing;
a rotational shaft supported rotatably by the bearing;
a turbine wheel including a hub part disposed on an axial end of the rotational shaft and a plurality of rotor blades protruding outwardly in a radial direction from a circumferential face of the hub part; and
a housing which accommodates the turbine wheel and which at least includes a rotational shaft housing section accommodating the rotational shaft, a scroll part which swirls gas having been introduced into the housing around the rotational shaft, and a bend section which is formed around the rotational shaft housing section and configured to direct gas having flowed out from an outlet of the scroll part in an axial direction,
wherein the housing includes a bypass flow path which is disposed at an upstream side with respect to a housing end face facing an upstream end face of the hub part of the turbine wheel and through which the bend section and the rotational shaft housing section are in communication with each other.

2. The axial-flow turbine for a turbocharger according to claim 1,
wherein the rotational shaft housing section is in communication with the bend section through the bypass flow path at a position where a pressure in the bend section is higher than an atmosphere pressure.

3. The axial-flow turbine for a turbocharger according to claim 1,
wherein the rotational shaft housing section is partitioned into a bearing side and a turbine wheel side by a sealing part disposed between the bearing and the turbine wheel, and
wherein the bend section and the turbine wheel side of the rotational shaft housing section are in communication with each other through the bypass flow path.

4. The axial-flow turbine for a turbocharger according to claim 1,
wherein the housing includes a protruding portion disposed on an outer circumferential edge of the housing end face facing the upstream end face of the hub part of the turbine wheel, the protruding portion protruding from the housing end face.

5. The axial-flow turbine for a turbocharger according to claim 1,
wherein a diameter of the upstream end face of the hub part of the turbine wheel is smaller than a diameter of the outer circumferential edge of the housing end face facing the upstream end face of the hub part.

* * * * *